Patented Dec. 13, 1932

1,890,969

UNITED STATES PATENT OFFICE

NEWCOMB K. CHANEY, OF LAKEWOOD, OHIO, ASSIGNOR TO NATIONAL CARBON CO., INC., A CORPORATION OF NEW YORK

METHOD OF TREATING WATER

No Drawing.   Application filed December 13, 1928.   Serial No. 325,923.

My invention relates to processes for purifying water.

In the purification of water by chlorination the amount of chlorine added is in excess of that which is necessary to destroy the bacteria in the water. The excess of chlorine reacts with organic substances other than bacteria which are present in the water. Therefore, the chlorinated water normally contains free chlorine, compounds of chlorine with the hydrogen and oxygen of the water, and compounds of chlorine with such organic compounds as phenols. Chlorine is objectionable because it is corrosive to water pipes and because it gives the water an objectionable odor. Some of the organic compounds of chlorine are objectionable because they have an offensive odor and taste.

It is known that these objectionable substances can be removed by subjecting the water to the action of activated carbon as for example, by passing the water through a bed of activated cocoanut charcoal of the kind described in my patents, Nos. 1,497,543 and 1,497,544. In such a process a considerable proportion of the carbon is consumed in reactions with the chlorine and water which produce hydrochloric acid and carbon dioxide as ultimate products. Since a highly activated carbon is desirable for the sorption of the organic chlorine compounds and other malodorous substances present in the water, the expense of the process is greatly increased because of the large quantities of such carbon which are consumed in chemically reacting with water and chlorine in the manner above referred to.

I have discovered that the free chlorine can be effectually removed by a much cheaper variety of carbon, presently to be described, and that the use of highly activated carbon may be restricted to a subsequent stage of the process wherein it acts mainly or entirely as a sorbent.

The material used for the removal of the free chlorine may consist of granules of anthracite coal or other carbonaceous material which have been treated with superheated steam at temperatures above 700° C., and preferably about 970° C. so that only the surfaces of the granules are activated. The material may have, for example, a carbon tetrachloride absorption value of only about 6% as compared to an absorption value of 50% for highly activated cocoanut charcoal. The absorbing capacity of this material is not sufficient to adapt it for use as an absorbent for organic substances but as above stated it will react and combine with chlorine in water. Superficial activation of the material greatly increases its efficacy although the carbon acts essentially as a chemical reagent. Instead, however, of the layer of active carbon being consumed, leaving an inert residue, the superficially activated granules display the surprising advantage that they maintain a substantially unimpaired activity, presumably due to a self-activating property whereby an additional quantity of the interior of the particle becomes active as the outer layer is consumed.

As illustrative of my invention, I take a water containing bacteria and a small quantity of phenol and add chlorine in excess of the amount which will combine with the organic substances. When chlorination is complete, the water is first passed through a bed of surface activated carbon, such as that referred to. The water is given a sufficiently long treatment with this material for the chlorine to react and form hydrochloric acid and oxides of carbon which are carried out with the water. The water leaving this bed is practically chemically inert toward activated carbon but it contains phenol, or compounds of phenol which are capable of being absorbed in activated charcoal and which are deleterious to the water.

The water is next passed through a bed of highly activated carbon, for example, activated cocoanut charcoal, having a carbon tetrachloride absorption value of 50%. This material absorbs the phenolic substances in its pores and the water is discharged free from objectionable odors and tastes. The highly activated carbon is not consumed by the chlorine. When the pores of the activated cocoanut charcoal become clogged, it may be steamed out or treated by any of the well-known methods to restore its activity.

My invention provides a practical method of treating chlorinated water whereby the uncombined chlorine is caused to react with an inexpensive material which is consumed, and then to be acted upon by a highly absorbent material which removes objectionable constituents but which do not combine with the activated carbon.

I do not wish to limit my invention to the specific modification described. An artificial zeolite may be substituted for the activated carbon and used as the absorbent. As other modifications may be made without departing from the spirit of my invention I do not wish to be limited except by the prior art and by the invention as defined in the annexed claims.

I claim as my invention:

1. The method of treating liquid containing bacteria destroying agents which react chemically and combine with active carbon which first comprises treating the liquid with a partially activated carbonaceous material having a low absorptive value and then with a highly absorptive material.

2. The method of treating water which comprises adding chlorine thereto, treating the chlorinated water with a partially activated carbon which has a low absorptive value and subsequently with a highly absorptive material.

3. The method of treating water which comprises adding chlorine thereto in excess of that which will combine with organic substances present, treating the chlorinated water with a surface-activated carbon which has a low absorptive value and is capable of reacting with the excess of chlorine and subsequently treating the water with a highly absorptive material capable of removing organic substances from the water.

4. The method of treating water which comprises adding chlorine thereto in excess of that which will combine with organic substances present, treating the chlorinated water with a surface-activated carbon which has a low absorptive value and is capable of reacting with the excess of chlorine and subsequently treating the water with activated carbon having a high absorptive value.

5. The method of treating water which comprises adding chlorine to the water, treating with a catalytic carbon containing material comprising anthracite coal which has been treated with superheated steam to render a surface layer thereof capable of acting catalytically and of combining with chlorine to form hydrochloric acid, and subsequently treating with activated carbon having a high absorptive value.

6. The method of treating a liquid containing an undesirable constituent capable of being removed by both highly activated carbonaceous material and partially activated carbonaceous material and also containing an undesirable constituent capable of being removed only by a highly activated carbonaceous material which comprises treating the liquid first with partially activated carbonaceous material and subsequently treating said liquid with highly activated carbonaceous material.

In testimony whereof, I affix my signature.

N. K. CHANEY.

CERTIFICATE OF CORRECTION.

Patent No. 1,890,969.                December 13, 1932.

NEWCOMB K. CHANEY.

It is hereby certified that error appears in the printed specification of the above numbered patent requiring correction as follows: Page 2, line 22, claim 1, for "first comprises" read "comprises first"; and that the said Letters Patent should be read with this correction therein that the same may conform to the record of the case in the Patent Office.

Signed and sealed this 24th day of January, A. D. 1933.

(Seal)                                           M. J. Moore,
                                                  Acting Commissioner of Patents.